United States Patent [19]

Mast

[11] Patent Number: 5,796,363
[45] Date of Patent: Aug. 18, 1998

[54] AUTOMATIC POSITION CALCULATING IMAGING RADAR WITH LOW-COST SYNTHETIC APERTURE SENSOR FOR IMAGING LAYERED MEDIA

[75] Inventor: Jeffrey E. Mast, Livermore, Calif.

[73] Assignee: The Regents of the University of California, Oakland, Calif.

[21] Appl. No.: 609,812

[22] Filed: Mar. 1, 1996

[51] Int. Cl.[6] .................... G01S 13/89; G01S 13/90
[52] U.S. Cl. .................... 342/22; 342/25; 342/179; 342/180; 342/196; 342/197
[58] Field of Search .................... 342/22, 179, 180, 342/196, 197, 25, 357

[56] References Cited

U.S. PATENT DOCUMENTS

| | | | |
|---|---|---|---|
| 5,161,204 | 11/1992 | Hutcheson et al. | 382/16 |
| 5,210,798 | 5/1993 | Ekchian et al. | 382/14 |
| 5,274,714 | 12/1993 | Hutcheson et al. | 382/15 |
| 5,455,590 | 10/1995 | Collins et al. | 342/179 |
| 5,465,308 | 11/1995 | Hutcheson et al. | 382/159 |
| 5,557,283 | 9/1996 | Sheen et al. | 342/179 |

OTHER PUBLICATIONS

Jeffrey Edward Mast, "Microwave Pulse-Echo Radar Imaging for the Nondestructive Evaluation of Civil Structures," Thesis, University of Illinois at Urbana-Champaign, Urbana, Illinois, 1993.

*Primary Examiner*—John B. Sotomayor
*Attorney, Agent, or Firm*—Henry P. Sartorio; Richard B. Main

[57] ABSTRACT

An imaging system for analyzing structures comprises a radar transmitter and receiver connected to a timing mechanism that allows a radar echo sample to be taken at a variety of delay times for each radar pulse transmission. The radar transmitter and receiver are coupled to a position determining system that provides the x,y position on a surface for each group of samples measured for a volume from the surface. The radar transmitter and receiver are moved about the surface to collect such groups of measurements from a variety of x,y positions. Return signal amplitudes represent the relative reflectivity of objects within the volume and the delay in receiving each signal echo represents the depth at which the object lays in the volume and the propagation speeds of the intervening material layers. Successively deeper z-planes are backward propagated from one layer to the next with an adjustment for variations in the expected propagation velocities of the material layers that lie between adjacent z-planes.

8 Claims, 6 Drawing Sheets

AUTOMATIC POSITION CALCULATING IMAGING RADAR WITH LOW-COST SYNTHETIC APERTURE SENSOR FOR IMAGING LAYERED MEDIA

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to imaging radars and more particularly to portable systems for near-field, high-resolution two-dimensional and three-dimensional imaging in solid, multilayered lossy dielectric media.

2. Description of Related Art

Pulse-echo radar and image processing can be used for nondestructive evaluation where two-dimensional and three-dimensional images are formed to visualize the interior composition of major concrete structures and to identify the internal components. The ground-penetrating form of pulse-echo radar has been used in the prior art to locate hazardous wastes, to image the profile of lake bottoms, to determine the depths of ice formations, and to characterize geological interfaces. Prior art radar system and data processing methods have been developed for characterizing the volumes beneath the scanning surfaces. Pulse-echo radar has conventionally been used in the nondestructive evaluation of civil structures and materials, e.g., to locate embedded reinforcement bars (rebar), beams, columns, ductwork, cables, conduit, and enclosures encased by concrete, masonry, and otherwise impenetrable construction materials. The locating of defects such as cracks, voids, areas of low density, damage due to fatigue, and fractures is very helpful in maintaining and keeping such structure safe.

Pulse-echo radar and generalized holographic imaging methods have been used in seismic imaging, acoustical imaging, and diffraction tomography, as well as in synthetic aperture radar, where two-dimensional and three-dimensional spatial images of sub-surface regions are constructed from the data acquired with the pulse-echo radar. A radar system operated in monostatic mode can be used to collect one-dimensional and two-dimensional synthetic apertures by scanning an antenna over the surface of a volume, e.g., over the surface of a bridge roadway. Such data can then be processed to provide a space-time profile of radar signal echoes from the interior structures, e.g., subsurface scattering interfaces. The raw data obtained is a time-domain record of the scattered wavefield at the scanning surface and the positions of each observation. Inverse filtering helps measure the time-delay experienced through the media by the returned echoes. The positions of scatterers and reflecting interfaces can then be approximated from the time-delay information to form a spatial image by using backward propagation methods. Such image formation methods can take particular advantage of the wideband nature of pulse-echo radar to increase resolution in both the azimuthal and range directions.

In practice, synthetic apertures are not infinite, and this degrades the azimuthal resolution because a finite aperture limits the information available to reconstruct each of the images, albeit often only on the fringes. Variations in the character of the medium, e.g., planar layers, dispersives, and conductive materials, can also each impede proper image reconstruction. Unknown propagation velocities of the signals through the intervening media also have a negative effect. The length of a practical antenna can cause an overlap from one position of observation in the aperture to another and thus degrade the azimuthal resolution. Limits in determining the positions of observation also lead to errors and poor images. And, in general, backward propagation does not account for multiple scattering and other nonlinearities that can hinder image reconstruction.

Simulated and experimental results have demonstrated the effectiveness of pulse-echo radar imaging and the backward propagation method. Numerical finite difference time domain (FDTD) methods have been used to provide two-dimensional modeling of pulse-echo radar data for arbitrary structural configurations. FDTD simulated data has been used to demonstrate the resolving capabilities of the backward propagation method which can distinguish between different structural compositions. The FDTD method has been shown to be useful in providing simulated data from arbitrary subsurface object distributions.

In a three-dimensional implementation, image formation is based on data acquired from a two-dimensional synthetic aperture, e.g., as provided by a pulse-echo radar. Afterwards, planar slicing helps to visualize the three-dimensional image data, plane-by-plane. Rendering methods borrowed from computed tomography and magnetic resonance image data in medical applications provide surface rendering of the image data for an overall perspective of the spatial configuration of the subsurface features in the three dimensions.

Thus pulse-echo radar imaging has been used in the prior art to nondestructively evaluate and peer into portions of an existing civil structure. The depth, span, and size of beam, girders, flues, masonry arches in floors, and columns in walls have been estimated, although not perfectly. The mechanical stepping and thickness of outer granite facings on the walls and the presence of wire mesh and reinforcement in concrete could also be discerned with greater clarity. Clear, high-resolution information is very useful to structural engineers who must analyze the integrity of structures.

The present inventor, Jeffrey Mast, published his Ph.D. thesis in 1993 at the University of Illinois at Urbana-Champaign. The fundamentals of pulse-echo radar are discussed and the framework for an imaging algorithm is established that is a linear inverse source method for reconstructing scattering objects by modeling them as radiating secondary sources. Such inversion method uses plane-to-plane wave propagation. The principles of wave propagation and their relationship to the acquired data are described with a radar system used to acquire data to verify and test the algorithm. The FDTD simulation method and some of the non-idealities encountered when applying the imaging method to civil structures and materials are also addressed. Various modifications and extensions are used to improve the image reconstruction in the presence of some of these non-idealities. Two-dimensional and three-dimensional image reconstructions of concrete specimens comprising a variety of occlusions are included.

With time-delay echoes, the most dominant information describes the various distances to the scattering interfaces. For a monostatic radar in which the transmitter is also the receiver, the target distance or range and the propagation velocity of the pulse in the medium both control the echo delay times. Thus the accuracy with which the range distance can be determined depends on estimating the material of the medium and its corresponding propagation velocity. If the exact composition of the medium is not known, the propagation velocity can be empirically derived. However, if the medium is not entirely homogenous, such estimates can be a major source of error.

Information about the size of the object and its quality as a signal reflector are represented in the amplitude of the signal echoes. Larger and better reflectors produce echoes with higher signal amplitudes. The signal echo amplitudes can be reduced by attenuation losses if the medium is partially conductive. Increasing range also reduces signal echo amplitudes exponentially. Some amount of information about the composition of objects in the volume can be obtained from the relative phase of the echoes with respect to the phase of the transmitted pulse.

The accuracy of the calculation of distances to scattering interfaces depends on how precisely the time-delay of the echoes can be measured. Ideally, each returned echo is a scaled and time-shifted version of the transmitted pulse. Thus, a reference point on the pulse can be used to calculate the time-delay, e.g., either the leading or trailing edge of the pulse. In the presence of noise such reference points can be hard to determine. Correlation or inverse filtering of the incoming signal with the transmitted pulse can be used to produce a peak at the time-delay of the echo and provide a reference point that is much easier to locate.

SUMMARY OF THE INVENTION

An object of the present invention is to provide an imaging system for analyzing structures.

A further object of the present invention is to provide a system for imaging structures comprised of layers of dissimilar materials that effect the propagation velocity of pulse radars differently.

Briefly, an imaging system of the present invention for analyzing structures comprises a radar transmitter and receiver connected to a timing mechanism that allows a radar echo sample to be taken at a variety of delay times for each radar pulse transmission. The radar transmitter and receiver are coupled to a position determining system that provides the x,y position on a surface for each group of samples measured for a volume from the surface. The radar transmitter and receiver are moved about the surface to collect such groups of measurements from a variety of x,y positions. Return signal amplitudes represent the relative reflectivity of objects within the volume and the delay in receiving each signal echo represents the depth at which the object lays in the volume and the propagation speeds of the intervening material layers. Successively deeper z-planes are backward propagated from one layer to the next with an adjustment for variations in the expected propagation velocities of the material layers that lie between adjacent z-planes.

An advantage of the present invention is that a system is provided for imaging the internal features of structures using non-invasive methods.

A further advantage of the present invention is that an imaging system is provided for the high resolution of features in structures that have different material layers, e.g., asphalt overlying concrete and rebar.

A still further advantage of the present invention is that an imaging system is provided for the high resolution of features in structures using only a randomly positioned single transmit/receive element to generate data.

DETAILED DESCRIPTION OF THE INVENTION

Figure 1:
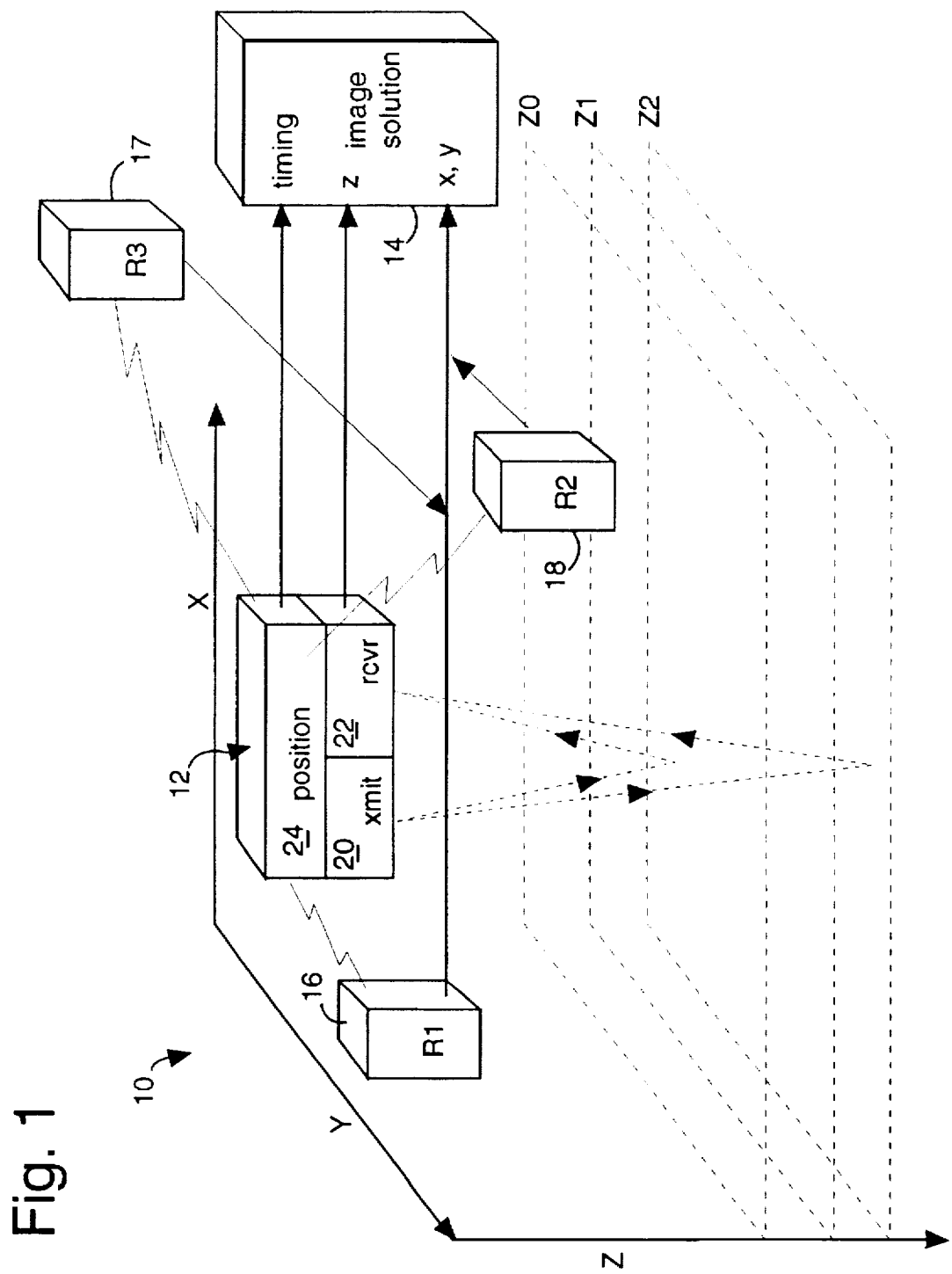
FIG. 1 is a diagram of a nondestructive evaluation (NDE) system embodiment of the present invention.

FIG. 1 illustrates a nondestructive evaluation (NDE) system embodiment of the present invention, referred to herein by the general reference numeral 10. The NDE system 10 comprises a data acquisition unit 12 that emits and collects ultra-wideband (UWB) radar signals that penetrate a solid in a z-axis. The data acquisition unit 12 is moved about outside the solid in an x-axis, y-axis plane. The z-axis radar signal data information collected is provided to an image reconstruction unit 14. A plurality of radar time-of-flight measurement units, represented by three position receivers (R1-R3) 16-18, provide triangulation information from known respective positions that contribute to the solution of the x,y position of the data acquisition unit 12. Any one position of the data acquisition unit 12 affords a measurement from a single observation point into the z-axis, specifically into the solid volume in z-planes, e.g., z0, z1, z2 . . . , etc. Such a single point of observation is also known as an aperture. A synthetic aperture radar (SAR) data collection is used by illuminating the solid with 200 MHz to 5 Ghz wideband radio frequency pulses periodically launched by a transmitter 20. Other radar frequencies can also be used.

A receiver 22 is gated once after each periodic pulse launch to sample the return signal from scattering objects with the solid. Hundreds or thousands of analog samples are taken at various delay times after the pulse launches to collect a complete time series. These samples are digitized and organized according to their respective delay times. The time-of-flight for signals scattered and returned by objects lying in the z0-plane, for example, will be shorter than those signals scattered and returned by objects lying in the z1-plane, or deeper z-planes. The wavefield propagation time between z-planes and the acquisition unit 12 can vary in the z-axis if different layered media are involved.

A position transmitter 24 periodically transmits a radio frequency pulse that is received and measured by position receivers 16-18. The free-space time-of-flight to each receivers 16-18 is compared and the position of the acquisition unit 12 is solved by triangulation. A timing pulse may or may not be supplied by the position transmitter 24 to the image reconstruction unit 14. Preferably, the pulses transmitted by the position transmitter 24 and radar transmitter 20 are time multiplexed in such a way that their corresponding receivers cannot confuse one with the other. Alternatively, other means can be used for gathering realtime positioning information, such as optical and acoustical based triangulation systems.

It is critical that each z-measurement provided to the image reconstruction unit 14 be associated with the correct x,y position solution. The x,y position solution also must be at least as accurate as the aperture resolution that is expected from the NDE system 10. A multitude of wideband z-measurements related to their respective x,y positions are collected by the image reconstruction unit 14, and then multiple-frequency diffraction tomography is used to backward propagate a two-dimensional image for the z0-plane from the variety of apertures visited by the acquisition unit 12. The same multiple-frequency diffraction tomographic method is used to backward propagate a two-dimensional image for the z1-plane from the z0-plane, and so on down to the bottom z-plane of interest. As different layered media with varying speeds of wavefield propagation are encountered, the backward propagation is adjusted z-plane to z-plane in the successive backward propagation to take in the appropriate velocity of propagation there existing. False color or gray-scale images can be used to represent objects remotely-sensed within each z-plane.

Useful and practical information related to the implementation of position transmitter 24 and position receivers 16–18, can be found in the wire and wireless versions of TIME-OF-FLIGHT RADIO LOCATION SYSTEM, U.S. patent application Ser. No. 08/300,909, filed Sep. 6, 1994, SHORT RANGE RADIO LOCATOR SYSTEM, U.S. patent application Ser. No. 08/510,979, filed Aug. 3, 1995, and ULTRA WIDEBAND RECEIVER, U.S. Pat. No. 5,345,471, issued Aug. 2, 1995, all by Thomas E. McEwan and all incorporated herein by reference.

Figure 2:
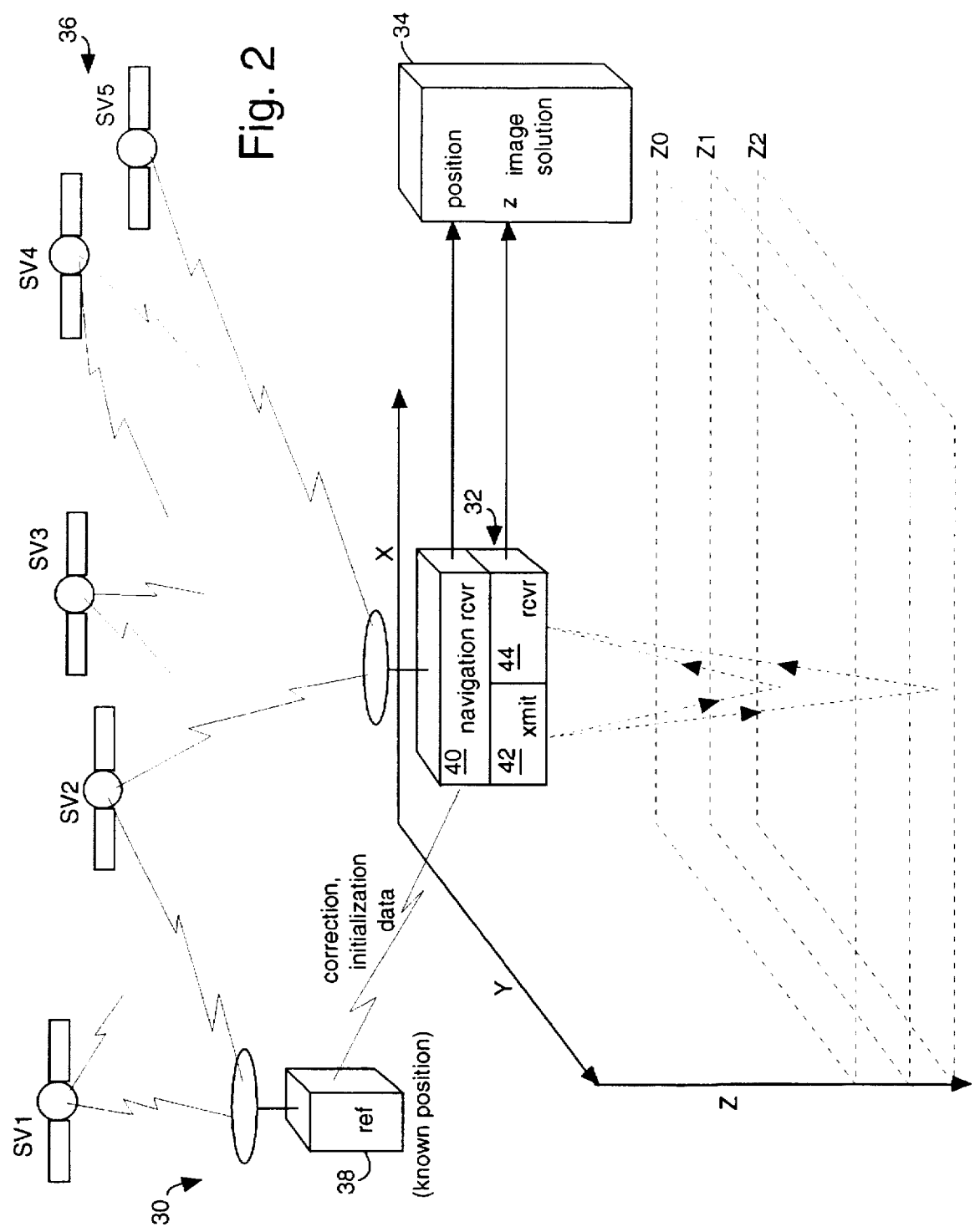
FIG. 2 illustrates another nondestructive evaluation (NDE) system embodiment of the present invention.

FIG. 2 illustrates another nondestructive evaluation (NDE) system embodiment of the present invention, referred to herein by the general reference numeral 30. The NDE system 30 also comprises a data acquisition unit 32 that emits and collects ultra-wideband (UWB) radar signals that penetrate a solid in a z-axis. The data acquisition unit 32 is freely moved about outside the solid in an x-axis, y-axis plane, e.g., farther afield than would be NDE system 10. The z-axis radar signal data information collected is provided to an image reconstruction unit 34, which is similar to the image reconstruction unit 14. A constellation 36 of satellite vehicles (SV1–SV5) transmit time and ranging information on direct sequence spread spectrum (DSSS) L-band microwave transmissions from orbit. For example, the conventional global positioning system (GPS), part of the NAVISTAR program, operated by the United States Department of Defense (US/DoD) is used.

A real-time kinematic (RTK) on-the-fly (OTF) position and navigation method is used to provide sub-centimeter accurate position solutions for the data acquisition unit 32, e.g., over an area of several kilometers, such as a bridge deck. A stationary reference station 38 has a known position that was obtained by an independent high-accuracy survey. Signals are received from the constellation 36 and RTK solutions are initialized by resolving the carrier integer ambiguities to each satellite in the constellation 36 in a navigation receiver 40 which uses phase information from each carrier and timing and code ranging information to compute the apparent sub-centimeter level position of the reference station 38. The known position is subtracted from the apparent position solution, and the correction and RTK-initialization data are then radio-linked constantly to a navigation receiver 40. Real-time sub-centimeter position solutions are provided for the data acquisition unit 32 by the satellite navigation receiver 40 to the image reconstruction unit 34. The reference station 38 and navigation receiver 40 can comprise commercially-available instruments, e.g., GPS SURVEYOR as sold by Trimble Navigation, Ltd. (Sunnyvale, Calif.).

U.S. Pat. No. 5,442,363, issued Aug. 15, 1995, to Remondi, describes a method and apparatus for determining the precise coordinate of a remote roving on-the-fly signal receiver with respect to a reference signal receiver. The reference signal receiver is usually fixed, but movement of the reference signal receiver is possible. The reference receiver and remote roving receiver track four or more satellites so that single difference code and carrier ranges between the receivers can be formed. The method can work with just L1 signal alone, the preferred method uses at least one code range (e.g., C/A code) and two carrier ranges (e.g., L1 and L2) with full wavelength L2-squared implementation addition code ranges if available for use. This method allows for initialization of carrier integer ambiguities whether reference or remote receiver are fixed or moving relative to each other and a robust procedure for determining integer ambiguities.

In the same way as in NDE system 10, any one position of the data acquisition unit 32 affords a measurement from a single observation point into the z-axis, specifically into the solid volume in z-planes, e.g., z0, z1, z2 . . . , etc. Such a single point of observation is also known as an aperture. A synthetic aperture radar (SAR) data collection is used by illuminating the solid with, e.g., 200 MHz to 5 Ghz, wideband radio frequency pulses periodically launched by a transmitter 42. A receiver 44 is gated once after each periodic pulse launch to sample the return signal from scattering objects with the solid. Hundreds or thousands of analog samples are taken at various delay times after the pulse launches to collect a complete time series. These samples are digitized and organized according to their respective delay times. The time-of-flight for signals scattered and returned by objects lying in the z0-plane, for example, will be shorter than those signals scattered and returned by objects lying in the z1-plane, or deeper z-planes.

The wavefield propagation time between z-planes and the acquisition unit 32 can vary in the z-axis if different layered media are involved. It is critical that each z-measurement provided to the image reconstruction unit 34 be associated with the correct x,y position solution. The x,y position solution also must be at least as accurate as the aperture resolution that is expected from the NDE system 30. A multitude of wideband z-measurements related to their respective x,y positions are collected by the image reconstruction unit 34, and then multiple-frequency diffraction tomography is used to backward propagate a two-dimensional image of the z0-plane from the variety of apertures visited by the acquisition unit 32. The same multiple-frequency diffraction tomographic method is used to backward propagate a two-dimensional image for the z1-plane from the z0-plane, and so on down to the bottom z-plane of interest. As different layered media with varying speeds of wavefield propagation are encountered, the backward propagation is adjusted z-plane to z-plane to account for changes in the velocity of propagation in each layer. False color or gray-scale images can be used to represent objects remotely-sensed within each z-plane.

Figure 3:
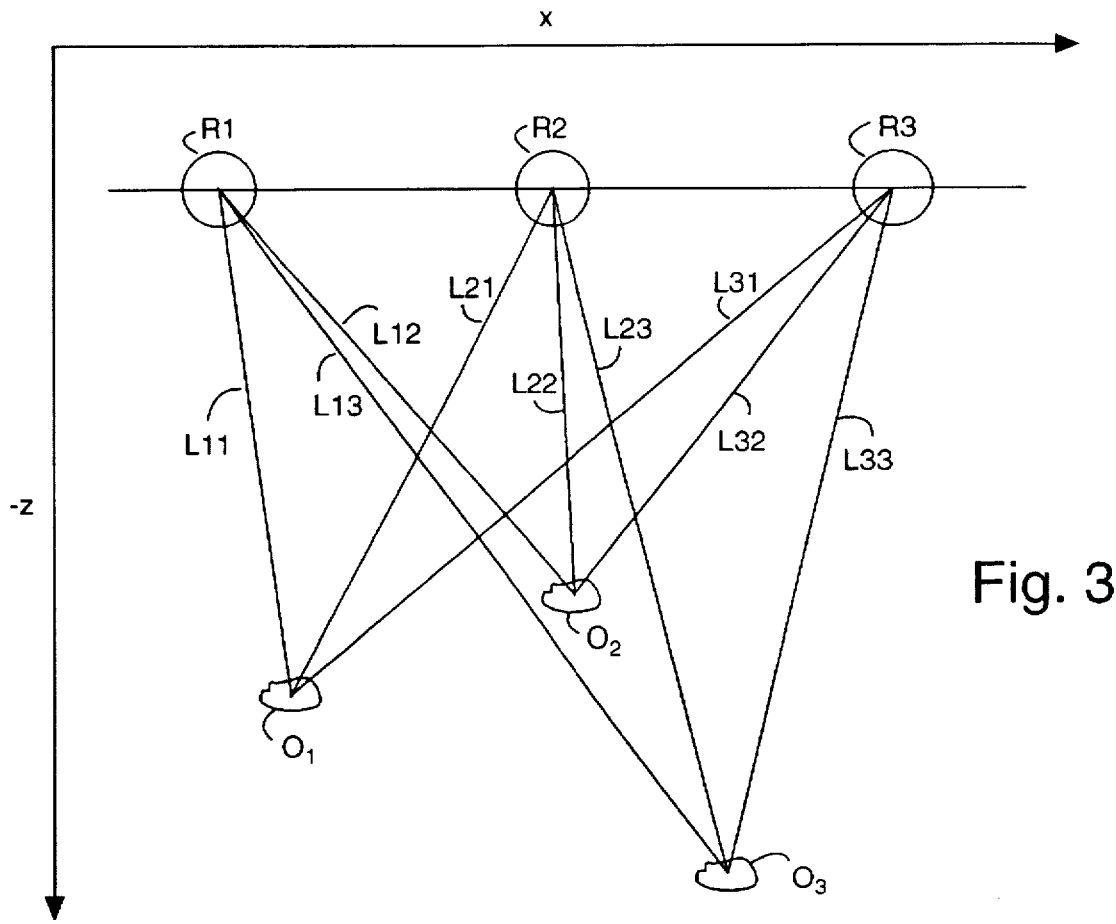
FIG. 3 represents a single y-plane of the volume being imaged in FIGS. 1 and 2.

FIG. 3 represents a single y-plane of the solid being imaged in FIGS. 1 and 2. Three x-axis receiver positions (R1–R3) for taking measurements by the data acquisition units 12 and 32 are shown. The transmitter and transmitter signal lines are not shown to allow the scattered signals from three objects (O1–O3) in the solid to be shown with greater clarity. The signal scattered in an echo by the object O1 is reflected along a line L11 to receiver position R1, along a line L21 to the receiver position R2, and along a line L31 to the receiver position R3. The signals scattered by objects O2 and O3 are similar. Each signal arrives at the respective receiver positions R1–R3 at times that are dependent on the three-dimensional positions of the objects O1–O3 and among other factors that will be left out for the moment.

Figure 4:
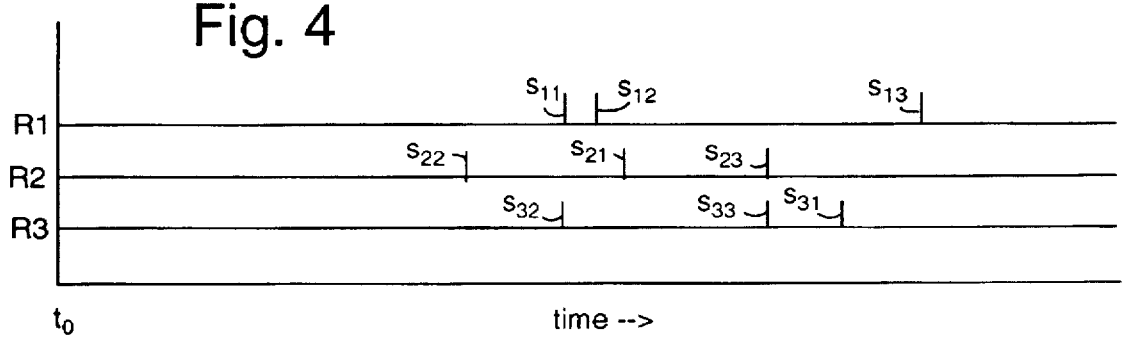
FIG. 4 represents the timing of the signals that are received at the respective receiver positions R1-R3.

FIG. 4 represents the timing of the signals that are received at the respective receiver positions R1–R3. The direction of arrival for each signal $s_{11}$, $s_{12}$, $s_{13}$, $s_{21}$, $s_{22}$, $s_{23}$, $s_{31}$, $s_{32}$ and $s_{33}$ is indeterminate. But the locations of each object O1–O3 can be determined by triangulation.

Figure 5:
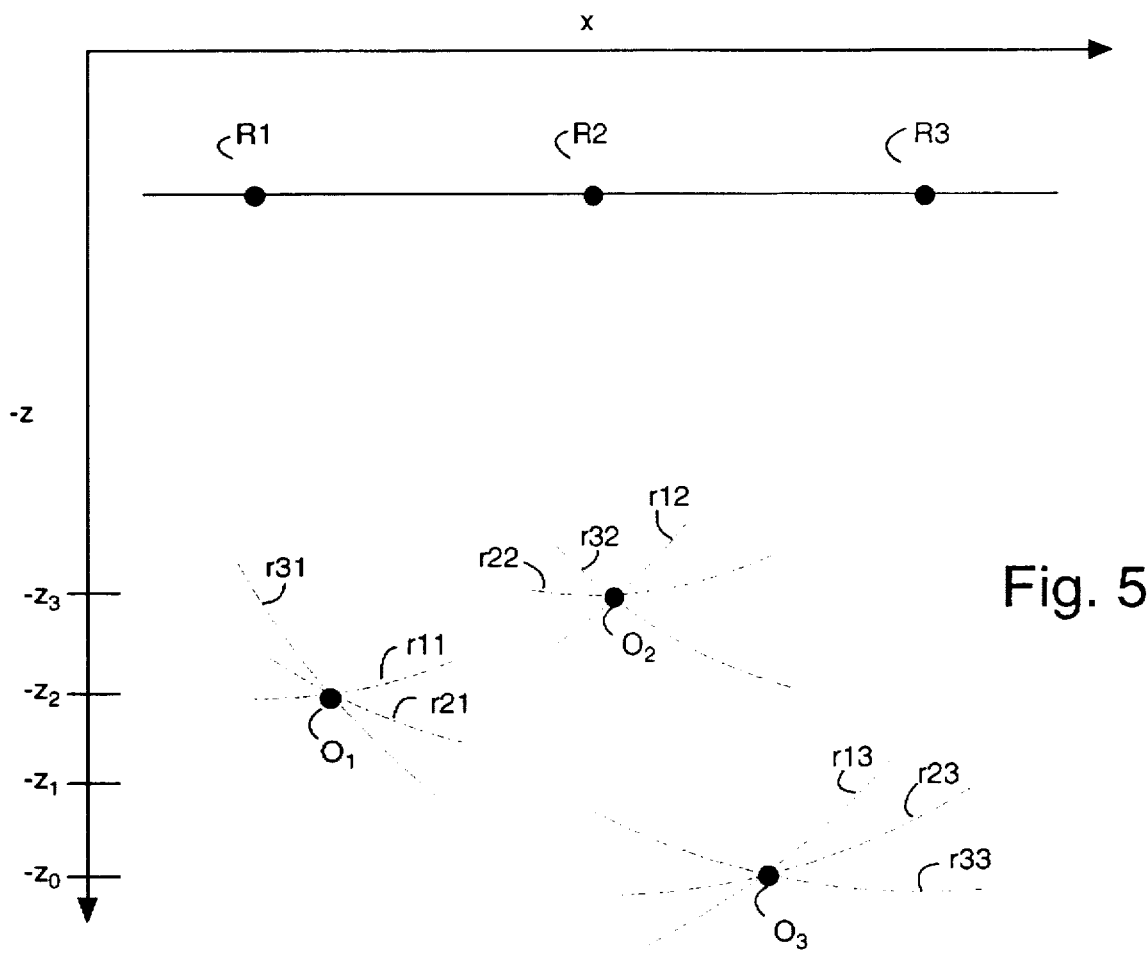
FIGS. 5 and 6 represent the use of the timing of each signal $s_{11}$, $s_{12}$, $s_{13}$, $s_{21}$, $s_{22}$, $s_{23}$, $s_{31}$, $s_{32}$ and $s_{33}$ as a radius $r_{11}$, $r_{12}$, $r_{13}$, $r_{21}$, $r_{22}$, $r_{23}$, $r_{31}$, $r_{32}$ and $r_{33}$, where the radii intersects represent the locations of the scattering sources, e.g., O1-O3.
Figure 6:
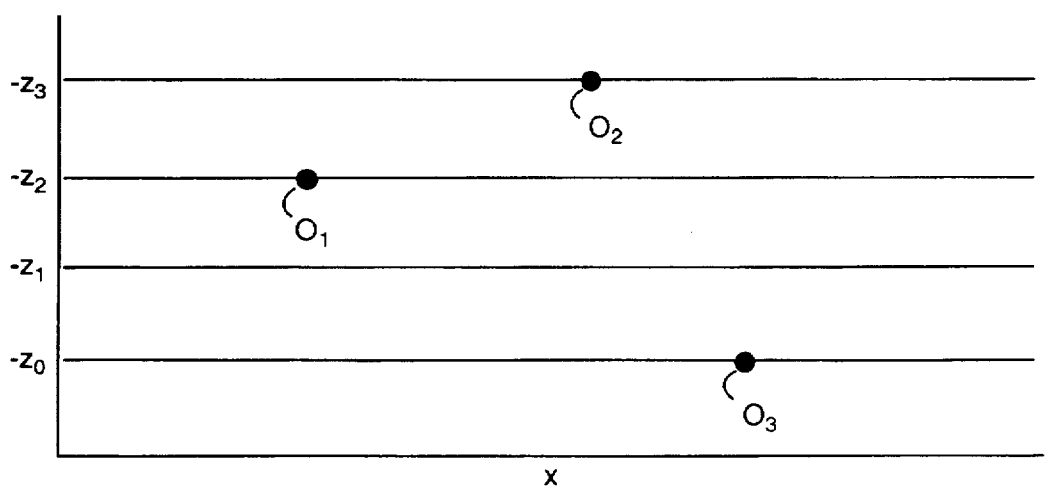

FIGS. 5 and 6 represent the use of the timing of each signal $s_{11}$, $s_{12}$, $s_{13}$, $s_{21}$, $s_{22}$, $s_{23}$, $s_{31}$, $s_{32}$ and $s_{33}$ as a radius $r_{11}$, $r_{12}$, $r_{13}$, $r_{21}$, $r_{22}$, $r_{23}$, $r_{31}$, $r_{32}$ and $r_{33}$. Where the radii intersects represent the locations of the scattering sources, e.g., O1–O3.

Figure 7:
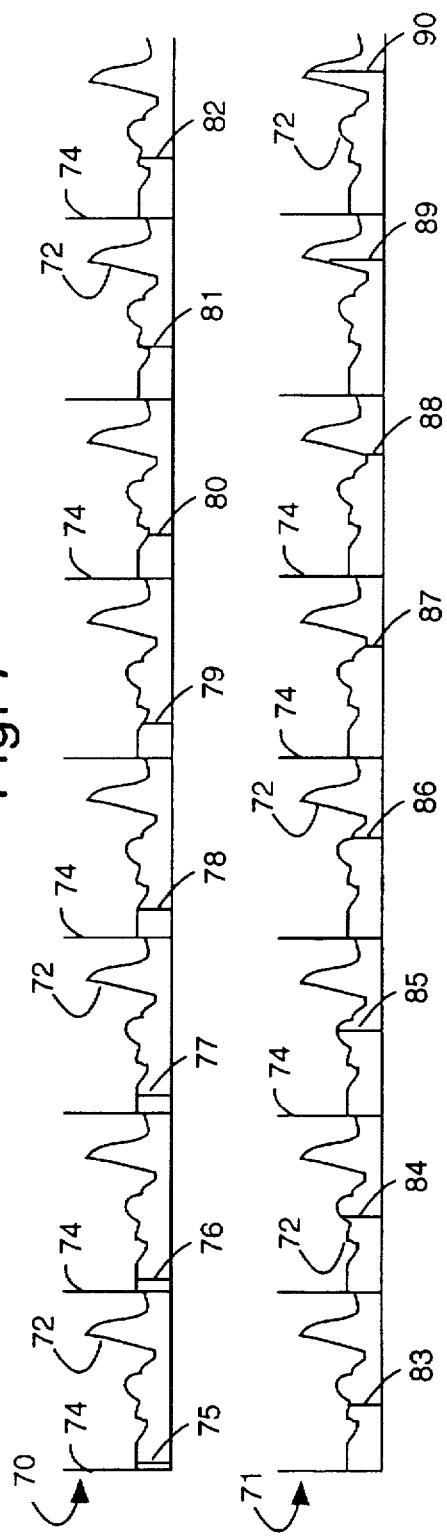
FIG. 7 shows how the data is collected by the acquisition unit.

FIG. 7 shows how the data is collected by the acquisition unit 12. A pair of timelines 70 and 71 each comprise several identical waveforms 72. At the beginning of a regular period, e.g., every 100 nanoseconds, a pulse 74 is output by the transmitter 20. The return signal is represented in analog voltage over time by the waveform 72. The capture and digitization of a complete single one of waveform 72 would require expensive components in the receiver 22. Instead, a sequence of samples 75–90 are obtained, each slightly delayed from the previous one from a burst of transmitter pulses 74.

Figure 8:
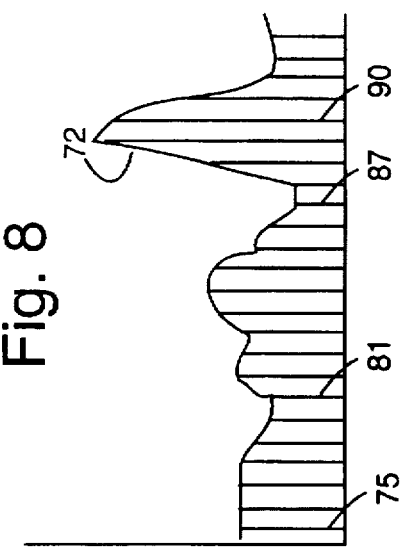
FIG. 8 represents the assembly of the samples to approximate the whole waveform.

FIG. 8 represents the assembly of the samples 75–90 to approximate the waveform 72. Such discrete points represent the energy returned from various depths and angles in the volume, as viewed from a single position.

Figure 9:
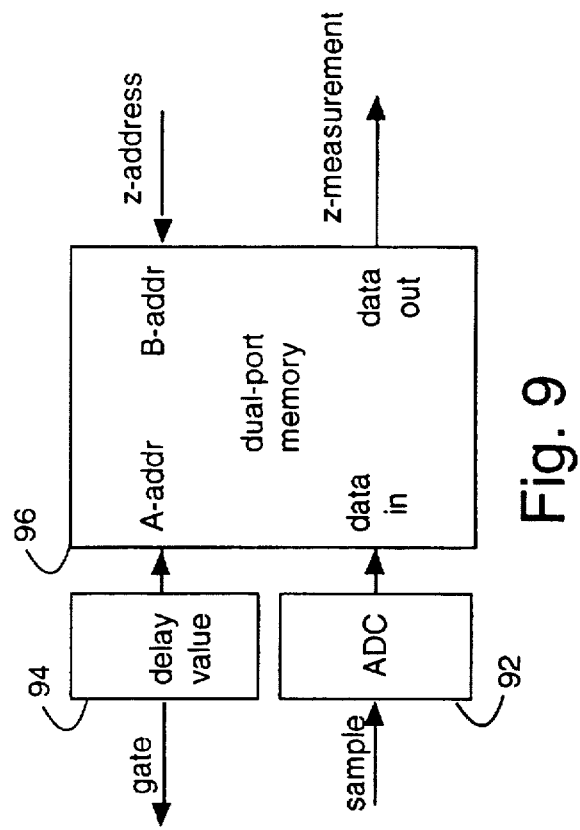
FIG. 9 is a block diagram showing how an analog-to-digital converter and a delay value are used to store the amplitude information gathered according to echo delay time to a dual-port memory.

In FIG. 9, an analog-to-digital converter 92 and a delay value 94 are used to provide the amplitude information gathered according to echo delay time to a dual-port memory 96. A readout that sequences through all the addresses then is able to retrieve a digital representation of the waveform 72 for each point of measurement.

Figure 10:
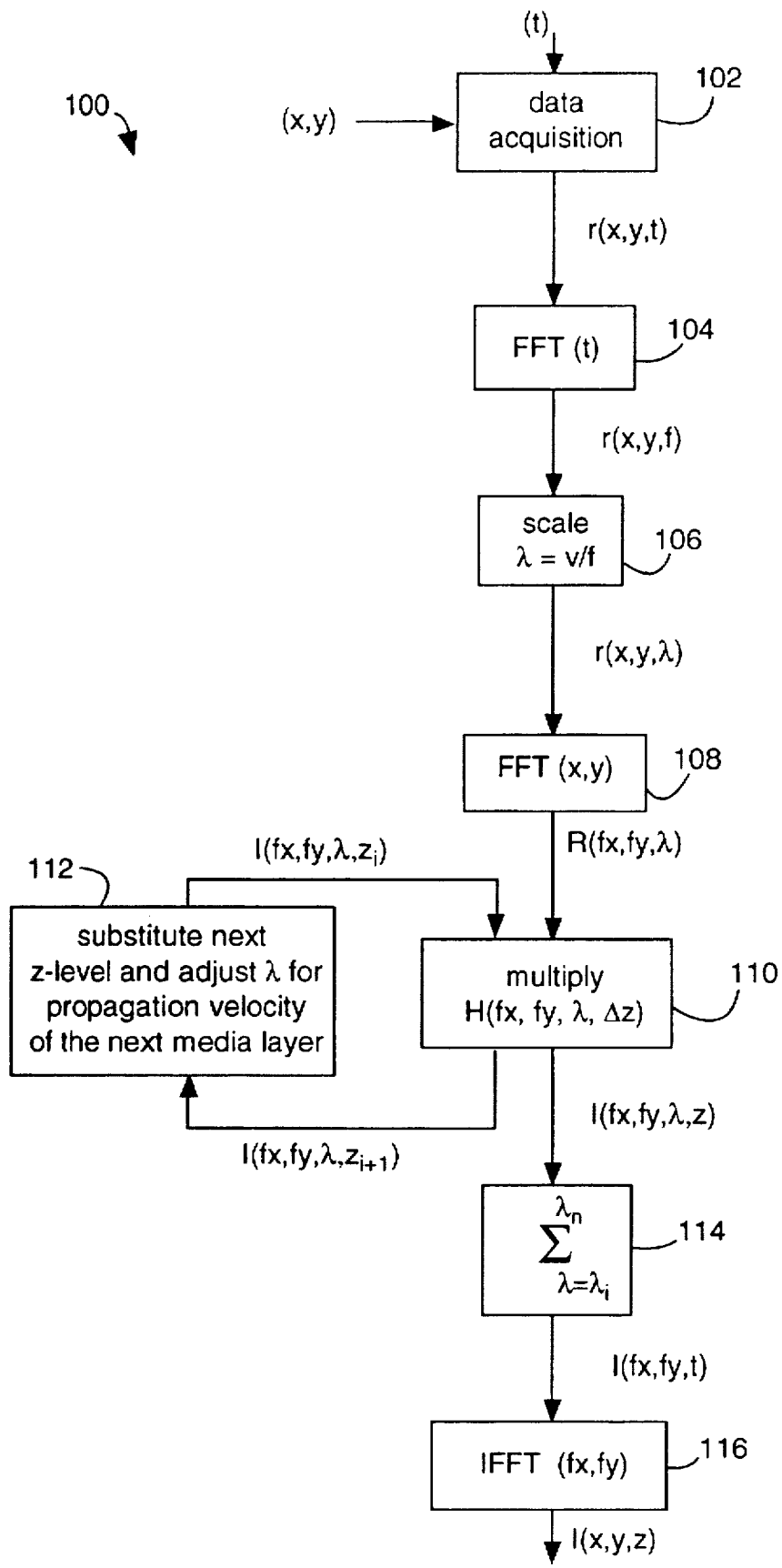
FIG. 10 illustrates a computer process for extracting tomographic images from the data collected in systems of FIGS. 1 and 2.

FIG. 10 illustrates a computer process 100 for extracting tomographic images from the data collected in systems 10 and 30. The time delay information (t) provided by the radar signal penetration of the solid from a plane of observation is collected and matched with the positions (x,y) of each observation in a data acquisition step 102. The data set is referred to in the convenient mathematical form, r(x,y,t). A step 104 does a fast Fourier transform (FFT) with respect to time to place it in the frequency domain, the result is expressed here as r(x,y,f). A step 106 scales frequency with media propagation velocity to operate with lambda. The result is expressed conveniently as r(x,y,λ).

In determining the wavefield received by the receiver at all its positions, the scatter from buried objects is assumed to follow Born's approximation for weak scattering. See, M. Born, et al., *Principles of Optics*, New York: Pergamon Press, sixth edition, 1980. The material of the intervening layer is assumed to be homogeneous. Successively deeper layers are assumed also to be homogeneous, but difference between layers can be accounted for by adjusting the propagation velocity "v". The approximation linearizes the scattering problem and relates the transmitted wavefield "u", at a given wavelength "λ", the object distribution "o(x,y,z)" and the received wavefield "r" with, $$r(x,y;\lambda) = \int [o(x,y,z';\lambda) u(x,y,z';\lambda)] ** g(x,y,z';\lambda) dz',$$

where "g" is the Green's function and "**" indicates convolution. The Green's function for homogeneous background material is, $$g(x,y,z;\lambda) = \frac{e^{jkr}}{4\pi r}, \text{ where } r = \sqrt{x^2 + y^2 + z^2}, \text{ and } k = \frac{2\pi}{\lambda}.$$

Thus with monostatic illumination with an isotropic radiator, the received wavefield becomes, $$r(x,y;\lambda) = o(x,y,z') ** g^2(x,y,z';\lambda) dz'.$$

The dependency on $g^2$ is removed by taking the derivative with respect to k, $$\tilde{r}(x,y,\lambda) = \frac{\partial}{\partial k} r(x,y,\lambda) = C \int o(x,y,z') ** g\left(x,y,z';\frac{\lambda}{2}\right) dz',$$

where C is a constant. For further information, see, J. Mast, et al., "Three-dimensional ground penetrating radar imaging using multi-frequency diffraction tomography", Lawrence Livermore National Laboratory, University of California publication UCRL-JC-116340, Jul. 26, 1994.

The first backward propagation will almost always be through the air that invariably separates the radar equipment from the surface of the solid. So the propagation velocity through this layer will approximate the free-space velocity. Once backward propagation is commenced within the solid, the propagation velocity is preferably adjusted to provide the best overall imaging results.

In conventional diffraction tomography, the tomographic data is obtained by rotating the objects to be imaged. Here, and for synthetic aperture pulse-echo radar, the tomographic information is extracted from the wideband pulse which includes multiple illuminating wavelengths. Superimposing each wavelength and then doing an inverse FFT results in an estimate of the object distribution with resolution improved by the richness of the information provided by the multiple illuminating wavelengths.

In a step 108, another fast Fourier transform (FFT) is done with respect to (x,y) to yield a result expressed here as R(fx,fy,λ), where "fx" and "fy" denote spatial frequencies in the x-axis and y-axis. If this is the first time through, a step 110 backward-propagates to the next deeper layer by multiplying R(fx,fy,λ) with a spatial filter H(fx,fy,λ,Δz) to yield image layer I(fx,fy,λ,$z_{i+1}$), otherwise the spatial filter is multiplied with the previous result, I(fx,fy,λ,$z_i$), to backward propagate from one deep layer to the next deeper layer. The spatial filter is given as, $$H(f_x,f_y,z;\lambda) = \begin{cases} e^{j2\pi z \sqrt{\frac{1}{\lambda^2} - f_x^2 - f_y^2}}, & f_x^2 - f_y^2 = \frac{1}{\lambda^2}, \\ 0, & \text{otherwise} \end{cases}$$

where the factor of two inside the square root accounts for the two-way travel path of the radar pulse. The spatial spectrum of the equivalent source is, $$S(f_x,f_y,z) = \int R(f_x,f_y,\lambda) H^{-1}(f_x,f_y,\lambda) d\lambda,$$

where R is the received wavefield and $H^{-1}$ is the pseudo inverse. The estimate of the source distribution is given by the inverse two-dimensional Fourier transform $\hat{S}$.

The process of backward propagation begins with a starting z-plane that can be equated to a hologram. For example, see Heyser, U.S. Pat. No. 4,279,019, issued Jul. 14, 1981, incorporated herein by reference. Both time and phase information are recorded in such starting z-plane that represent what is illuminating it in radio frequency from deeper z-planes. Unlike an ordinary optical holographic projection, the process 100 projects (focuses) only to the next deeper z-plane. This next deeper z-plane is then used as a basis for projecting to a still deeper z-plane. All the projected z-planes are an equal distance $\Delta z$ apart, e.g., to reduce the effort needed to do the multiplication in the step 110.

When still deeper z-planes are to be resolved, a step 112 sets the next z-level and adjusts for any expected change in propagation velocity for the new media. Otherwise, a step 114 integrates or sums the images I(fx,fy,$\lambda$,z) to form an output (Ifx,fy,t). Step 114 performs the super-positioning of all the information collected at the various radar frequencies and uses them to produce sharper estimates of the positions of objects. A step 116 does an inverse FFT with respect to (fx,fy) and yields the final images for the z-planes, I(x,y,z).

All the z-planes could be backward projected from the received field, without stepwise backward propagating. But since each would involve a different distance "d", the computational load increases substantially. Therefore, it is preferable to do the stepwise backward propagation at regular intervals "$\Delta d$" layer-by-deeper-layer.

As is common in the computer art, the process 100 can be implemented with a combination of computer hardware and software. The line of demarcation between hardware and software can be freely adjusted in accordance with the needs of particular applications. For example, in order to increase the speed of computing the various tomographic images, the fast Fourier functions can be implemented in hardware designed for the purpose. Such devices are conventional and commercially available.

Several factors should be considered in forming a synthetic aperture. Echoes resulting from a pulse transmitted at a given radar position must not be recorded at subsequent radar positions. Range ambiguity would result because there would be no way of determining which echoes resulted from which transmitted pulse. Thus, the rate at which the radar transmits pulses, also known as the pulse repetition frequency, must be low enough so that echoes from previous transmitted pulses are from targets far enough away that the signal echo amplitudes is small enough to be considered negligible. On the other hand, the pulse repetition frequency cannot be so low that the antenna positions are too far apart.

Another factor affecting the data acquisition using a synthetic aperture is the beam width of the antenna. The antenna beam width determines the volume in which the energy of the pulse is distributed. Due to the reciprocity theorem of antennas, it also defines the volume and directions in which echoes will be received.

One of the major objectives of forming a synthetic aperture is to acquire enough information about the internal region in order to provide spatial information about the location of embedded objects. Using the time-delay profile we would like to form a spatial image of the scattering objects.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. An imaging radar system (10, 30), comprising:
   a radar transmitter (20, 42) and receiver (22, 44) connected to a timing mechanism (14, 36) that provides for a radar echo sample to be taken at a variety of delay times for each of a series of radar pulse transmission;
   a position determining system (16, 17, 18, 24, 32, 36) connected to the radar transmitter and receiver that provides an x,y position on a surface for each group of samples measured for a volume from said surface, wherein the radar transmitter and receiver are moved about said surface to collect such groups of measurements from a variety of x,y positions, and wherein a plurality of return signal amplitudes represent the relative reflectivity of objects within said volume and the delay in receiving each signal echo represents the depth at which an object lays in said volume and the propagation speeds of the intervening material layers; and
   means (14, 34, 100) for successively backward propagating deeper z-planes from one layer to the next with an adjustment for variations in the expected propagation velocities of a variety of material layers that lie between adjacent said z-planes, wherein each said z-plane contributes to a tomographic series of slices through said volume that contribute to the visualization of said objects in said volume in three dimensions.

2. The system of claim 1, wherein the means for successively backward propagating comprises a computer-implemented process (100) for:
   placing (104) said data in the frequency domain with a fast Fourier transform (FFT) with respect to time, the result being mathematically expressible as r(x,y,f);
   scaling (106) the frequency with media propagation velocity to operate with lambda, wherein the result may be expressed conveniently as r(x,y,$\lambda$);
   fast Fourier transforming (108) with respect to (x,y) to yield a result expressible as R(fx,fy,$\lambda$), where "fx" and "fy" denote spatial frequencies in the x-axis and y-axis;
   backward-propagating (110), if this is the first time through, to a next deeper layer by multiplying R(fx,fy,$\lambda$) with a spatial filter H(fx,fy,$\lambda$,$\Delta z$) to yield image layer I(fx,fy,$\lambda$,$z_{i+1}$), otherwise multiplying said spatial filter with a previous result, I(fx,fy,$\lambda$,$z_i$), to backward propagate from one deep layer to the next deeper layer, said spatial filter being represented by, $$H(f_x,f_y,z;\lambda) = \begin{cases} e^{j2\pi\sqrt{\frac{1}{\lambda^2} - f_x^2 - f_y^2}}, & f_x^2 - f_y^2 = \frac{1}{\lambda^2}, \\ 0, & \text{otherwise} \end{cases}$$

where the factor of two inside the square root accounts for the two-way travel path of the radar pulse, the spatial spectrum of the equivalent source is, $$S(f_x,f_y,z) = \int R(f_x,f_y,\lambda) H^{-1}(f_x,f_y,\lambda) d\lambda,$$

and where R is the received wavefield and $H^{-1}$ is the pseudo inverse, the estimate of the source distribution is given by the inverse two-dimensional Fourier transform S, wherein said process of backward propagation begins with a starting z-plane that can be equated to a hologram, and both time and phase information are recorded in such starting z-plane that represent what is illuminating it in radio frequency from deeper z-planes and projecting only to the next deeper z-plane that is then used as a basis for projecting to a still deeper z-plane, and wherein all said projected z-planes are an equal distance $\Delta z$ apart;

setting (112), when still deeper z-planes are to be resolved, a next z-level and adjusting for any expected change in propagation velocity for a new media integrating or summing (114) said images $I(fx,fy,\lambda,z)$ to form an output $(Ifx,fy,t)$ and super-positioning all said information collected at various radar frequencies for improving estimates of positions of objects; and inverse Fast Fourier transforming (116) with respect to (fx,fy) to yield a set of final images for said z-planes, expressed as $I(x,y,z)$.

3. The system of claim 1, wherein the positioning determining system comprises:

a position transmitter (24) that periodically transmits a radio frequency pulse that is received and measured by at least three position receivers (16–18), wherein the free-space time-of-flight to each receivers (16–18) is compared and the position of an acquisition unit (12) is solved for by triangulation and said positions determined contribute to the solution of the x,y position of said data acquisition unit (12).

4. The system of claim 1, wherein the positioning determining system comprises:

a navigation receiver (40) that determines its position from a constellation of orbiting satellites (36) and said position is connected to an image solution unit (34) with each corresponding collection of radar imaging data.

5. The system of claim 4, wherein the positioning determining system further comprises:

a real-time kinematic (RTK) on-the-fly (OTF) position and navigation method for sub-centimeter accurate position solutions and a stationary reference station (38) with a known position obtained by an independent high-accuracy survey, wherein signals are received from said constellation (36) and RTK solutions are initialized by resolving the carrier integer ambiguities to each satellite in the constellation (36) in said navigation receiver (40) by using phase information from each carrier and timing and code ranging information to compute the apparent sub-centimeter level position of the reference station (38), and the known position is subtracted from the apparent position solution, and the correction and RTK-initialization data are then radio-linked constantly to said navigation receiver (40), and wherein real-time sub-centimeter position solutions are provided for said data acquisition unit (32) by said satellite navigation receiver (40) to an image reconstruction unit (34).

6. The system of claim 1, wherein the radar transmitter (20, 42) and receiver (22, 44) connected to a timing mechanism (14, 34) include timing pulses that are transmitted by a position transmitter (24) or said radar transmitter (20) and are time multiplexed.

7. A computer process (100) for extracting tomographic images of a solid from a synthetic aperture radar swept through various points in a plane of observation, the method comprising the steps of:

collecting (102) data from time delay information (t) provided by a radar signal penetration of a solid from a plane of observation and matching said data with the corresponding positions (x,y) of each observation, wherein said data set may be referred to in the convenient mathematical form as $r(x,y,t)$;

placing (104) said data in the frequency domain with a fast Fourier transform (FFT) with respect to time, the result being mathematically expressible as $r(x,y,f)$;

scaling (106) the frequency with media propagation velocity to operate with lambda, wherein the result may be expressed conveniently as $r(x,y,\lambda)$;

fast Fourier transforming (108) with respect to (x,y) to yield a result expressible as $R(fx,fy,\lambda)$, where "fx" and "fy" denote spatial frequencies in the x-axis and y-axis;

backward-propagating (110), if this is the first time through, to a next deeper layer by multiplying $R(fx,fy,\lambda)$ with a spatial filter $H(fx,fy,\lambda,\Delta z)$ to yield image layer $I(fx,fy,\lambda,z_{i+1})$, otherwise multiplying said spatial filter with a previous result, $I(fx,fy,\lambda,z_i)$, to backward propagate from one deep layer to the next deeper layer, said spatial filter being represented by, $$H(f_x,f_y,z;\lambda) = \begin{cases} e^{j2\pi z \sqrt{\frac{1}{\lambda^2}-f_x^2-f_y^2}}, & f_x^2-f_y^2=\frac{1}{\lambda^2} \\ 0, & \text{otherwise} \end{cases}$$

where the factor of two inside the square root accounts for the two-way travel path of the radar pulse, the spatial spectrum of the equivalent source is, $$S(f_x,f_y,z) = \int R(f_x,f_y,\lambda) H^{-1}(f_x,f_y,\lambda) d\lambda,$$

and where R is the received wavefield and $H^{-1}$ is the pseudo inverse, the estimate of the source distribution is given by the inverse two-dimensional Fourier transform $\hat{S}$, wherein said process of backward propagation begins with a starting z-plane that can be equated to a hologram, and both time and phase information are recorded in such starting z-plane that represent what is illuminating it in radio frequency from deeper z-planes and projecting only to the next deeper z-plane that is then used as a basis for projecting to a still deeper z-plane, and wherein all said projected z-planes are an equal distance $\Delta z$ apart;

setting (112), when still deeper z-planes are to be resolved, a next z-level and adjusting for any expected change in propagation velocity for a new media integrating or summing (114) said images $I(fx,fy,\lambda,z)$ to form an output $I(fx,fy,t)$ and super-positioning all said information collected at various radar frequencies for improving estimates of positions of objects; and inverse Fast Fourier transforming (116) with respect to (fx,fy) to yield a set of final images for said z-planes, expressed as $I(x,y,z)$.

8. The method of claim 7, wherein:

the step of collecting (102) data from time delay information (t) provided by said radar signal penetration the scatter from buried objects is assumed to follow Born's approximation for weak scattering and the material of any intervening layers is assumed to be homogeneous; and wherein successively deeper layers are assumed also to be homogeneous with any difference between layers being accounted for by adjusting the propagation velocity "v" in the step of backward-propagating (110), such that the approximation linearizes the scattering problem and relates the transmitted wavefield "u", at a given wavelength "$\lambda$", the object distribution "$o(x,y,z)$" and the received wavefield "r" with, $$r(x,y;\lambda) = \iint o(x,y,z';\lambda) u(x,y,z';\lambda) **g(x,y,z';\lambda) dz',$$

where "g" is the Green's function and "**" indicates convolution, and the Green's function for homogeneous background material is, $$g(x, y, z; \lambda) = \frac{e^{jkr}}{4\pi r}, \text{ where } r = \sqrt{x^2 + y^2 + z^2}, \text{ and } k = \frac{2\pi}{\lambda},$$

and with monostatic illumination with an isotropic radiator, the received wavefield becomes, $$r(x, y; \lambda) = \int o(x, y, z') **g^2(x, y, z'; \lambda) dz',$$

such that the dependency on $g^2$ is removed by taking the derivative with respect to k.

$$\tilde{r}(x, y, \lambda) = \frac{\partial}{\partial k} r(x, y, \lambda) = C \int o(x, y, z')**g\left(x, y, z'; \frac{\lambda}{2}\right) dz',$$

and where C is a constant.

* * * * *